(12) United States Patent
Plickys

(10) Patent No.: US 10,502,097 B2
(45) Date of Patent: Dec. 10, 2019

(54) HYDRAULIC LINE ROUTING PLATE

(71) Applicant: HAMILTON SUNDSTRAND CORPORATION, Charlotte, NC (US)

(72) Inventor: Mark R. Plickys, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/262,400

(22) Filed: Jan. 30, 2019

(65) Prior Publication Data

US 2019/0162078 A1 May 30, 2019

Related U.S. Application Data

(62) Division of application No. 14/744,885, filed on Jun. 19, 2015, now Pat. No. 10,221,721.

(51) Int. Cl.
| | |
|---|---|
| *F01D 25/20* | (2006.01) |
| *B64C 11/38* | (2006.01) |
| *B64D 35/00* | (2006.01) |
| *F01D 15/12* | (2006.01) |
| *F02C 7/32* | (2006.01) |
| *F15B 13/08* | (2006.01) |
| *F16H 57/04* | (2010.01) |
| *F02C 6/20* | (2006.01) |

(52) U.S. Cl.
CPC .............. *F01D 25/20* (2013.01); *B64C 11/38* (2013.01); *B64D 35/00* (2013.01); *F01D 15/12* (2013.01); *F02C 6/206* (2013.01); *F02C 7/32* (2013.01); *F15B 13/0814* (2013.01); *F15B 13/0871* (2013.01); *F15B 13/0885* (2013.01); *F16H 57/0423* (2013.01); *F05D 2220/32* (2013.01); *F05D 2220/324* (2013.01); *F05D 2240/55* (2013.01); *F05D 2260/406* (2013.01); *F05D 2260/98* (2013.01)

(58) Field of Classification Search
CPC ......... F01D 25/20; B64C 11/38; B64D 35/00; F02C 7/00; F02C 7/32; F15B 13/0814; F15B 13/0871; F15B 13/0885; F16H 2708/00; F16H 57/0423
USPC ....................................... 415/122.1; 137/884
See application file for complete search history.

(56) References Cited

U.S. PATENT DOCUMENTS

| | | |
|---|---|---|
| 4,262,554 A | 4/1981 | Ahlen et al. |
| 4,719,812 A | 1/1988 | Machida et al. |
| (Continued) | | |

FOREIGN PATENT DOCUMENTS

| | | |
|---|---|---|
| EP | 0540192 A1 | 5/1993 |
| EP | 0816731 A2 | 1/1998 |
| (Continued) | | |

OTHER PUBLICATIONS

EP SR, Issued Nov. 17, 2016, U310615EP, EP Patent Application No. 16175339.7, 7 pages.

*Primary Examiner* — Timothy L Maust
(74) *Attorney, Agent, or Firm* — Cantor Colburn LLP

(57) ABSTRACT

A routing plate assembly is provided and includes a gearbox having an aft surface, first and second hydraulic components, a routing plate comprising a forward side affixable to the aft surface of the gearbox, an aft side to which the first and second hydraulic components are affixable and a body. The body is formed to define interfacial pathways by which the gearbox and the first and second hydraulic components are communicative.

11 Claims, 4 Drawing Sheets

(56) References Cited

U.S. PATENT DOCUMENTS

| | | | |
|---|---|---|---|
| 5,199,313 | A | 4/1993 | Muller |
| 5,611,372 | A | 3/1997 | Bauer et al. |
| 6,073,536 | A * | 6/2000 | Campbell ............... B62D 5/07 |
| | | | 91/516 |
| 6,789,522 | B2 | 9/2004 | Seymour |
| 7,010,906 | B2 | 3/2006 | Cazenave |
| 7,073,410 | B2 | 7/2006 | Albert |
| 7,516,621 | B2 | 4/2009 | Suttie et al. |
| 8,347,637 | B2 | 1/2013 | Suciu |
| 8,845,291 | B2 | 9/2014 | Swift |
| 8,984,974 | B2 | 3/2015 | Seitz et al. |
| 9,188,022 | B2 | 11/2015 | Plickys et al. |
| 2003/0037828 | A1 | 2/2003 | Gander |
| 2004/0045614 | A1 | 3/2004 | Subramanian et al. |
| 2005/0011564 | A1 | 1/2005 | Baraga et al. |
| 2007/0240415 | A1 | 10/2007 | Julien et al. |
| 2008/0202614 | A1 | 8/2008 | Mamyo et al. |
| 2011/0142648 | A1 | 6/2011 | Swift |
| 2011/0239660 | A1 | 10/2011 | Suciu |
| 2011/0314963 | A1 | 12/2011 | Poisson |
| 2012/0280092 | A1 | 11/2012 | Barre |
| 2014/0314546 | A1 | 10/2014 | Davis |

FOREIGN PATENT DOCUMENTS

| | | |
|---|---|---|
| EP | 1398513 A2 | 3/2004 |
| GB | 2461784 A | 1/2010 |

* cited by examiner

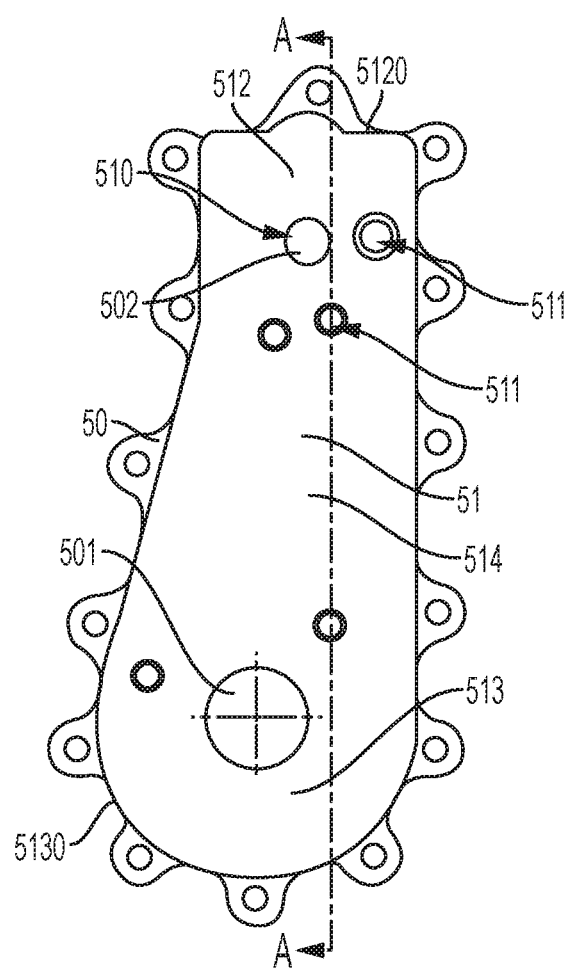
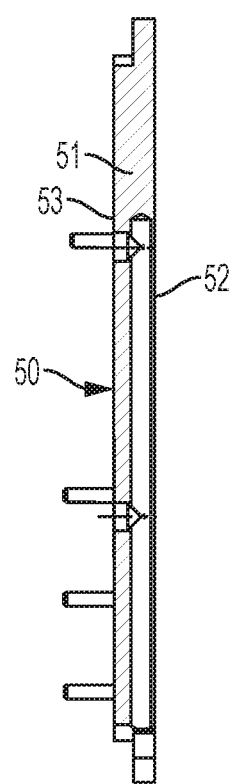
FIG. 4
FIG. 5

HYDRAULIC LINE ROUTING PLATE

CROSS-REFERENCE TO RELATED APPLICATION

This application is a divisional of U.S. application Ser. No. 14/744,885 filed Jun. 19, 2015. The entire contents of U.S. application Ser. No. 14/744,885 are incorporated herein by reference.

BACKGROUND OF THE DISCLOSURE

The subject matter disclosed herein relates to routing plate and, more particularly, to a routing plate for hydraulic lines between line replaceable units (LRUs).

Hydraulic components on aircraft gearboxes are typically interconnected via internal cast cores in the gearbox or by external hydraulic plumbing lines. Cast cores present a problem with gearbox design as they add significant cost and complexity to the gearbox housing manufacture. External plumbing lines present issues with the removal of components, as separation of the external line is typically required to remove the component, presenting additional interfaces for the potential of external oil leakage. Also, there is significant effort in achieving certification requirements with external plumbing lines due to requirements for survival in power plant fire zones.

BRIEF DESCRIPTION OF THE DISCLOSURE

According to one aspect of the disclosure, a routing plate assembly is provided and includes a gearbox having an aft surface, first and second hydraulic components, a routing plate comprising a forward side affixable to the aft surface of the gearbox, an aft side to which the first and second hydraulic components are affixable and a body. The body is formed to define interfacial pathways by which the gearbox and the first and second hydraulic components are communicative.

According to additional or alternative embodiments, the routing plate assembly further includes a rotatable propeller shaft, an oil transfer tube which is extendible from the gearbox, through the routing plate and into the second hydraulic component, and a gas turbine engine configured to generate rotational energy transmittable to the rotatable propeller shaft by the gearbox to drive rotations of the rotatable propeller shaft.

According to additional or alternative embodiments, the first hydraulic component includes a propeller hydraulic control unit and the second hydraulic component includes a fluid transfer bearing module.

According to additional or alternative embodiments, the propeller hydraulic control unit includes a gear pump element, a regulator valve and an electro-hydraulic servo valve.

According to additional or alternative embodiments, the interfacial pathways include a lube oil supply pathway running from the gearbox, through the routing plate and into the first hydraulic component.

According to additional or alternative embodiments, the interfacial pathways include a pump drive interface running from the gearbox, through the routing plate and into the first hydraulic component.

According to additional or alternative embodiments, the interfacial pathways include hydraulic pathways running from the propeller shaft, through the second component, through the routing plate and into the first component.

According to additional or alternative embodiments, the interfacial pathways includes a lube oil supply pathway running from the gearbox, through the routing plate and into the first hydraulic component, a pump drive interface running from the gearbox, through the routing plate and into the first hydraulic component and hydraulic pathways running from the propeller shaft, through the second component, through the routing plate and into the first component.

According to additional or alternative embodiments, the routing plate assembly further includes a transfer tube disposed along one of the interfacial pathways for first and second hydraulic component communication. The transfer tube includes a first portion sealably disposable in the routing plate and a second portion sealably disposable in the first or second hydraulic component.

According to another aspect of the disclosure, a routing plate assembly is provided and includes a gearbox having an aft surface, first and second hydraulic components, a routing plate comprising a forward side affixable to the aft surface of the gearbox, an aft side to which the first and second hydraulic components are affixable and a body. The body is formed to define a first interfacial pathway by which the gearbox and the first hydraulic component are mechanically communicative and second interfacial pathways by which the gearbox and the first and second hydraulic components are fluidly communicative.

According to additional or alternative embodiments, the routing plate further includes a transfer tube disposed along one of the interfacial pathways for first and second hydraulic component fluid communication. The transfer tube includes a first portion sealably disposable in the routing plate and a second portion sealably disposable in the first or second hydraulic component.

According to yet another aspect of the disclosure, a routing plate for hydraulic lines is provided and includes a forward side affixable to an aft gearbox surface, an aft side to which first and second hydraulic components are affixable and a body extending between the forward and aft sides. The body is formed to define interfacial pathways by which the gearbox and the first and second hydraulic components are communicative.

According to additional or alternative embodiments, the forward and aft sides are parallel.

According to additional or alternative embodiments, the body includes a first portion corresponding in location to a portion of the aft side to which the first hydraulic component is affixable, a second portion corresponding in location to a portion of the aft side to which the second hydraulic component is affixable and a third portion interposed between the first and second portions.

According to additional or alternative embodiments, the first portion has a partially rectangular shape, the second portion has a partially rounded shape and the third portion is tapered from the first to the second portion.

According to additional or alternative embodiments, the interfacial pathways include a lube oil supply pathway running from the gearbox, through the first portion of the routing plate and into the first hydraulic component.

According to additional or alternative embodiments, the interfacial pathways include a pump drive interface running from the gearbox, through the first portion of the routing plate and into the first hydraulic component.

According to additional or alternative embodiments, the interfacial pathways include hydraulic pathways running from the second component, through the second, third and first portions of the routing plate and into the first component.

According to additional or alternative embodiments, the interfacial pathways include a lube oil supply pathway running from the gearbox, through the first portion of the routing plate and into the first hydraulic component, a pump drive interface running from the gearbox, through the first portion of the routing plate and into the first hydraulic component and hydraulic pathways running from the second component, through the second, third and first portions of the routing plate and into the first component.

According to additional or alternative embodiments, the routing plate further includes a transfer tube disposed along one of the interfacial pathways for first and second hydraulic component communication. The transfer tube includes a first portion sealably disposable in the routing plate and a second portion sealably disposable in the first or second hydraulic component.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 4 is a front view of the routing plate of FIG. 1; and

FIG. 5 is a cross-sectional view of the routing plate taken along line A-A of FIG. 4.

Figure 1:
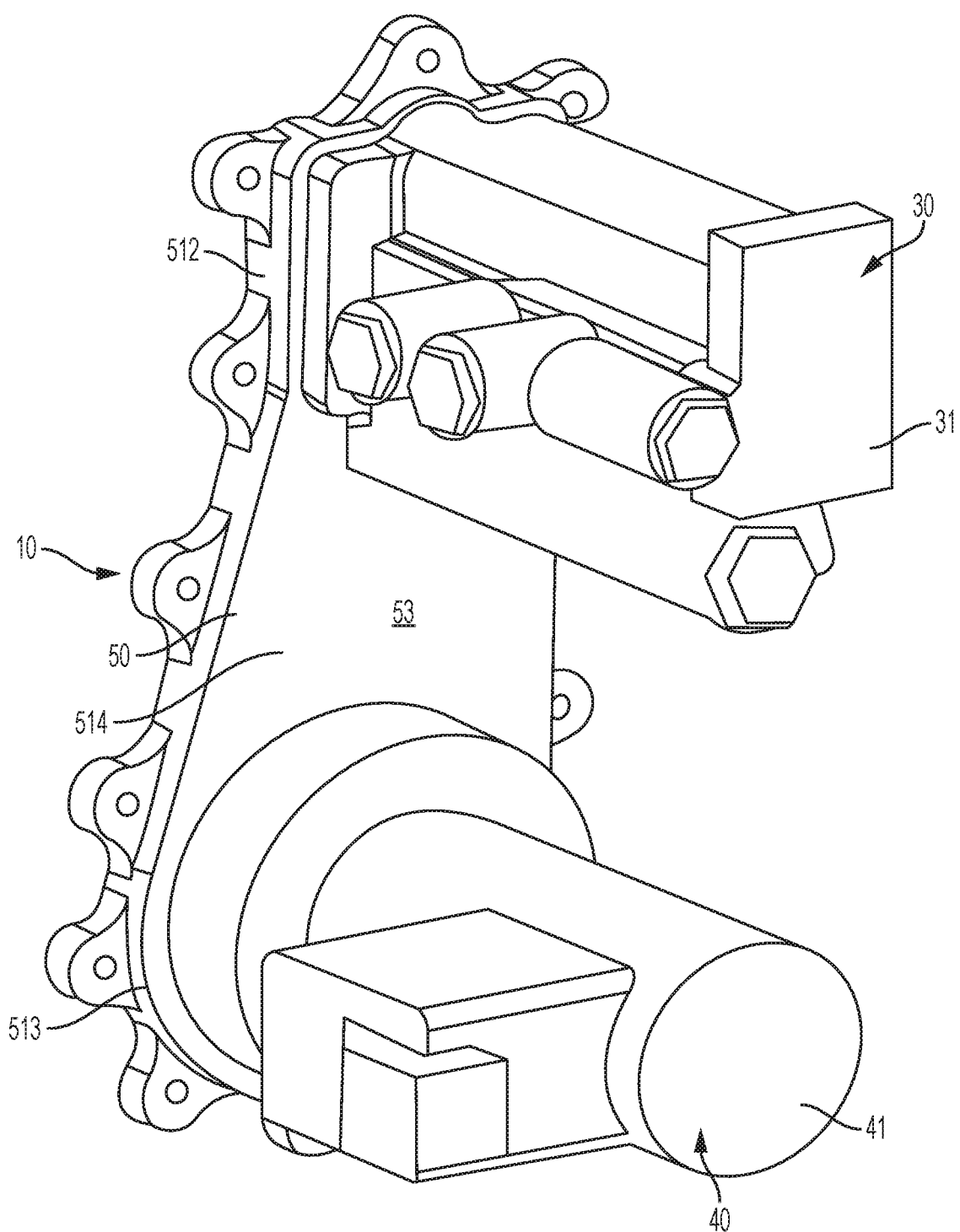
FIG. 1 is a perspective view of a routing plate assembly for aircraft gearbox-mounted components in accordance with embodiments.
Figure 2:
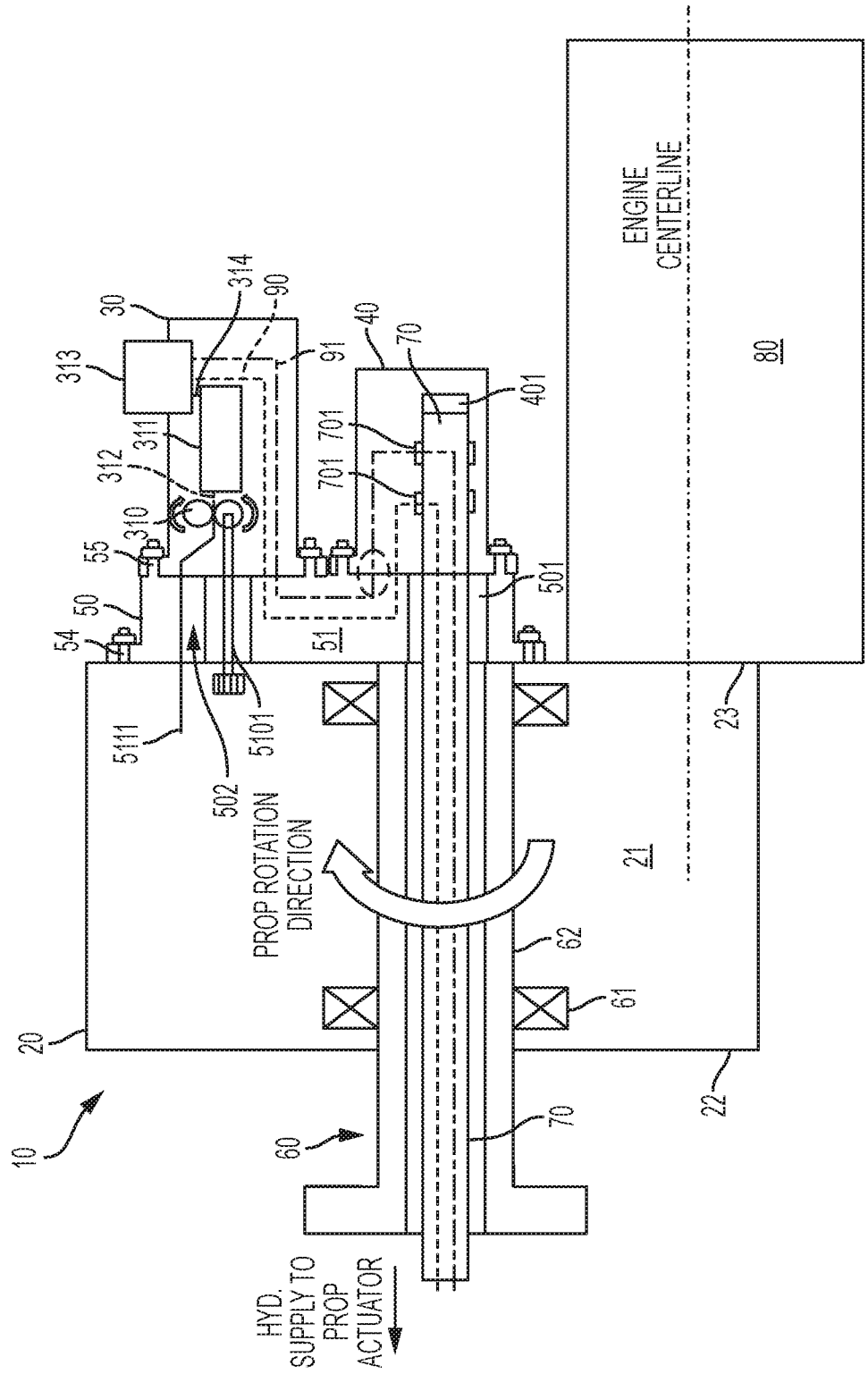
FIG. 2 is a side view of the routing plate assembly of FIG. 1.

The detailed description explains embodiments of the disclosure, together with advantages and features, by way of example with reference to the drawings.

DETAILED DESCRIPTION OF THE DISCLOSURE

As will be described below, a routing plate is provided and has internal plumbing lines that can extend between gearbox mounted components. The routing plate can be fastened to a back of the gearbox and provide for required hydraulic connections between components. The routing plate also provides for hydraulic connections at component interfaces as well as a mounting feature for components. The routing plate eliminates a need for complex internal cast cores in gearbox housings and minimizes difficulties with certification requirements for components mounted in fire zones.

With reference to FIGS. 1-5, a routing plate assembly 10 is provided and includes a reduction gearbox (RGB) 20 that has a body 21 with a forward surface 22 and an aft surface 23 on opposite side of the body 21, a first hydraulic component 30, a second hydraulic component 40 and a routing plate 50. The routing plate assembly 10 may be provided as part of an aircraft engine structure and may further include a propeller shaft assembly 60, an oil transfer tube 70 and a gas turbine engine 80. The propeller shaft assembly 60 includes bearing elements 61 and a rotatable propeller shaft 62 that is supported within the RGB 20 by the bearing elements 61 to extend beyond a plane of the forward surface 22. The oil transfer tube 70 extends forwardly beyond a distal forward end of the propeller shaft assembly 60 to a propeller actuator and aftwardly beyond a plane of the aft surface 23, through a first bore 501 defined in the routing plate 50 and into a partial bore 401 defined in the second component 40. The gas turbine engine 80 is configured to generate rotational energy and power that is transmittable to the rotatable propeller shaft 62 by way of gearing (e.g., reduction gearing) within the RGB 20 to drive rotations of the rotatable propeller shaft 62 about a longitudinal axis thereof.

As shown in FIGS. 4 and 5, the routing plate 50 includes a body 51 with a forward side 52 and an aft side 53 substantially parallel with and opposite the forward side 52 (see FIG. 5). The forward side 52 is affixable to the aft surface 23 of the RGB 20 by way of first fastening elements 54 (see FIG. 2). The first and second hydraulic components 30 and 40 are affixable to the aft side 53 by way of second fastening elements 55 (see FIG. 2). The body 51 extends between the forward and aft sides 52 and 53 and is formed to define first interfacial pathways 510 by which the RGB 20 and the first hydraulic component 30 are mechanically communicative with one another and second interfacial pathways 511 by which the RGB 20 and the first and second hydraulic components 30 and 40 are each fluidly communicative with each other.

The body 51 includes a first (or upper) portion 512, a second (or lower) portion 513 and a third (or central) portion 514. The first portion 512 thus corresponds in location to a portion of the aft side 53 to which the first hydraulic component 30 is affixable, the second portion 513 thus corresponds in location to a portion of the aft side 53 to which the second hydraulic component 40 is affixable and the third portion 514 is thus interposed between the first and second portions 512 and 513. In accordance with embodiments, the first portion 512 may have a partially rectangular shape 5120, the second portion 513 may have a partially rounded shape 5130 and the third portion 514 may be tapered from the lower edge of the first portion 512 to an upper edge of the second portion 513 (see FIG. 4).

With reference back to FIGS. 1 and 2, the first hydraulic component 30 may include a propeller hydraulic control unit 31 and the second hydraulic component 40 may include a fluid transfer bearing module 41. The propeller hydraulic control unit 31 includes a gear pump element 310, a regulator valve 311, which is coupled to the gear pump element 310 via coupling first internal hydraulic line 312 and which controls operations of the gear pump element 310, and an electro-hydraulic servo valve 313. The electro-hydraulic servo valve 313 is coupled to the regulator valve 311 via a second internal hydraulic line 314 and controls hydraulic fluid pressures within, for example, a propeller control system.

The electro-hydraulic servo valve 313 is further coupled to first and second internal hydraulic pathways 90 and 91 through which a fluid, such as oil, flows in first and second opposite directions. The first and second internal hydraulic pathways 90 and 91 run from the electro-hydraulic servo valve 313, through a body of the first hydraulic component 30 and into the lower section of the first portion 512 of the routing plate 50. From there, the first and second internal hydraulic pathways 90 and 91 run through the third portion 514, an upper section of the second portion 513 and into a body of the second hydraulic component 40. The first and second internal hydraulic pathways 90 and 91 then run through the body of the second component and into the oil transfer tube 70 by way of hydraulic annuli 701. Passages within the oil transfer tube 70 then rout hydraulic fluid to the propeller actuator.

The first interfacial pathways 510 include a pump drive interface 5101 by which the RGB 20 and the first hydraulic component 30 are mechanically communicative with each other. The pump drive interface 5101 extends from the RGB 20, through a second bore 502 defined in the first portion 512 of the routing plate 50 and into the first hydraulic component 30 where the pump drive interface 5101 is coupled with the gear pump element 310. The second interfacial pathways 511 include a lube oil supply pathway 5111. The lube oil supply pathway 5111 runs from the RGB 20, through the first portion 512 of the routing plate 50 and into the first hydraulic component 30 where the lube oil supply pathway couples with the gear pump element 310.

Figure 3:
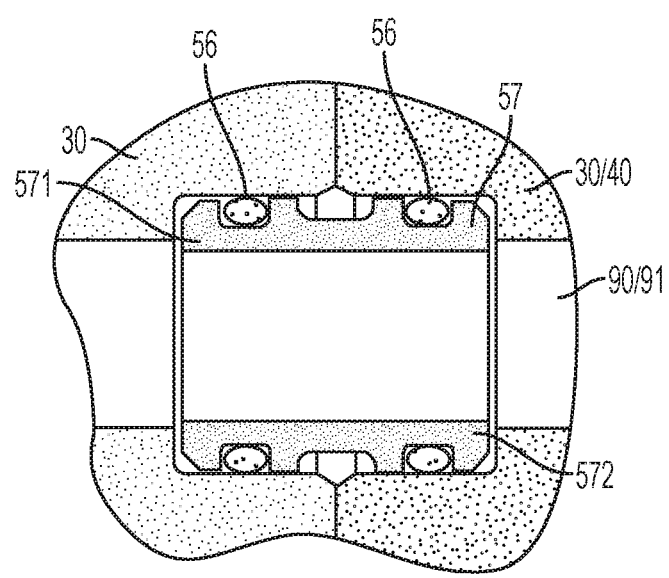
FIG. 3 is a cross-sectional view of the encircled portion of FIG. 2 identified as view "A"

As shown in FIG. 3, the routing plate 50 may further include sealing elements 56 and transfer tubes 57. The transfer tubes 57 are each disposed along one of the first and second internal hydraulic pathways 90 and 91 at the interface between the first hydraulic component 30 and the routing plate 50 at aft side 53. Each transfer tube 57 includes a first portion 571 and a second portion 572. The first portion 571 is sealably disposable in a recess formed in the aft side 53 of the routing plate 50 at the location of the corresponding one of the first and second internal hydraulic pathways 90 and 91. Similarly, the second portion 572 is sealably disposable in a recess formed in the forward side of the corresponding one of the first and second hydraulic components 30 and 40 at the location of the corresponding one of the first and second internal hydraulic pathways 90 and 91. The sealing elements 56 may be provided as o-ring seals and are disposable between exterior surfaces of the first and second portions 571 and 572 and interior surfaces of the recesses.

With the above noted arrangements of the sealing elements 56 and the transfer tubes 57, in the embodiment illustrated in FIGS. 1, 2, 4 and 5, it will be understood that the routing plate assembly 10 may include about four or five sets of sealing elements 56 and transfer tubes 57. That is, three sets may be respectively disposed at the three interfaces of the routing plate 50 and the first hydraulic component 30 along the first and second internal hydraulic pathways 90 and 91 and along a the lube oil supply pathway 5111 and two sets will be respectively disposed at the two interfaces of the routing plate 50 and the second hydraulic component 40 along the first and second internal hydraulic pathways 90 and 91.

In accordance with embodiments, an interior diameter of the transfer tubes 57 may be similar to an interior diameter of a bore formed to extend through the routing plate 50 and the first and second hydraulic components 30 and 40 to define the first and second internal hydraulic pathways 90 and 91. In accordance with further embodiments, as shown in FIG. 3, the interior diameter of the transfer tubes 57 may be slightly smaller than the interior diameter of the bore formed to extend through the routing plate 50 and the first and second hydraulic components 30 and 40 to define the first and second internal hydraulic pathways 90 and 91. However, it is to be understood that similar respective diameters may serve to minimize effects of hydraulic pressure drops.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A routing plate for hydraulic lines, the routing plate comprising:
    a forward side affixable to an aft gearbox surface;
    an aft side to which first and second hydraulic components are affixable; and
    a body extending between the forward and aft sides, the body being formed to define:
    a first interfacial pathway by which the gearbox and the first hydraulic component are communicative,
    a second interfacial pathway by which the gearbox and the first hydraulic component are communicative, and
    third interfacial pathways by which the first and second hydraulic components are communicative via the body.

2. The routing plate according to claim 1, wherein the forward and aft sides are parallel.

3. The routing plate according to claim 1, wherein the body comprises:
    a first portion corresponding in location to a portion of the aft side to which the first hydraulic component is affixable;
    a second portion corresponding in location to a portion of the aft side to which the second hydraulic component is affixable; and
    a third portion interposed between the first and second portions.

4. The routing plate according to claim 3, wherein the first portion has a partially rectangular shape, the second portion has a partially rounded shape and the third portion is tapered from the first to the second portion.

5. The routing plate according to claim 3, wherein the first interfacial pathways comprises a lube oil supply pathway running from the gearbox, through the first portion of the routing plate and into the first hydraulic component.

6. The routing plate according to claim 1, wherein the second interfacial pathways comprises a pump drive interface running from the gearbox, through the first portion of the routing plate and into the first hydraulic component.

7. The routing plate according to claim 1, wherein the third interfacial pathways comprise hydraulic pathways running from the second hydraulic component, through the second, third and first portions of the routing plate and into the first hydraulic component.

8. The routing plate according to claim 1, wherein:
    the first interfacial pathway comprises a lube oil supply pathway running from the gearbox, through the first portion of the routing plate and into the first hydraulic component,
    the second interfacial pathway comprises a pump drive interface running from the gearbox, through the first portion of the routing plate and into the first hydraulic component, and
    the third interfacial pathways comprise hydraulic pathways running from the second hydraulic component, through the second, third and first portions of the routing plate and into the first hydraulic component.

9. The routing plate according to claim 1, further comprising a transfer tube disposed along one of the third interfacial pathways, the transfer tube comprising:
 a first portion sealably disposable in the routing plate; and
 a second portion sealably disposable in the first or second hydraulic component.

10. A routing plate for hydraulic lines, the routing plate comprising:
 a forward side affixable to an aft gearbox surface of a gearbox;
 an aft side to which first and second hydraulic components are affixable; and
 a body extending between the forward and aft sides, the body being formed to define:
 a first interfacial pathways by which the gearbox and the first hydraulic components are communicative,
 a second interfacial pathway by which the gearbox and the first hydraulic component are communicative, and
 third interfacial pathways by which the first and second hydraulic components are communicative via the body,
 wherein the routing plate further comprises:
 a rotatable propeller shaft;
 an oil transfer tube, which is extendible from the gearbox and into the second hydraulic component; and
 a gas turbine engine configured to generate rotational energy transmittable to the rotatable propeller shaft by the gearbox to drive rotations of the rotatable propeller shaft.

11. A routing plate for hydraulic lines, the routing plate comprising:
 a forward side affixable to an aft gearbox surface;
 an aft side to which first and second hydraulic components are affixable;
 a body extending between the forward and aft sides, the body being formed to define:
 a first interfacial pathways by which the gearbox and the first hydraulic components are communicative,
 a second interfacial pathway by which the gearbox and the first hydraulic component are communicative, and
 third interfacial pathways by which the first and second hydraulic components are communicative via the body; and
 a transfer tube disposed along one of the third interfacial pathways, the transfer tube comprising a first portion sealably disposable in the body and a second portion sealably disposable in the first or second hydraulic component.

* * * * *